United States Patent [19]

Ivanoff

[11] 4,265,757
[45] May 5, 1981

[54] DEVICE FOR REMOVING OIL SLICKS

[76] Inventor: Alexander Ivanoff, 20 Brookside Dr., Greenwich, Conn. 06830

[21] Appl. No.: 19,000

[22] Filed: Mar. 9, 1979

[51] Int. Cl.³ .............................................. E02B 15/04
[52] U.S. Cl. .................................. 210/242.3; 210/923
[58] Field of Search .................. 210/83, 242, DIG. 25

[56] References Cited

U.S. PATENT DOCUMENTS

| | | | |
|---|---|---|---|
| 3,715,034 | 2/1973 | Ivanoff | 210/DIG. 25 |
| 3,812,968 | 5/1974 | Aramaki et al. | 210/DIG. 25 |
| 3,890,234 | 6/1975 | Galicia | 210/DIG. 25 |
| 3,959,136 | 5/1976 | Ayers | 210/DIG. 25 |
| 3,966,614 | 6/1976 | Ayers | 210/DIG. 25 |

FOREIGN PATENT DOCUMENTS

| | | | |
|---|---|---|---|
| 2352335 | 10/1973 | Fed. Rep. of Germany | 55/308 |
| 2623133 | 5/1976 | Fed. Rep. of Germany | 55/308 |
| 738474 | 12/1932 | France | 55/308 |

*Primary Examiner*—Theodore A. Granger
*Attorney, Agent, or Firm*—Hane, Roberts, Spiecens & Cohen

[57] ABSTRACT

Oil floating on a body of water is collected by moving a shallow-draft water craft, such as a barge, having a sternwardly slanted bow section and below the water line an ingress opening in or near the bow section through an oil slick. One or more preferably rearwardly slanted vanes extend crosswise on the flat bottom section between the water level and the ingress opening. The slant of the bow section increased by the action of the vanes forces oil in its path downwardly thereby causing the oil, possibly intermingled with water, to flow as a flat layer along the bottom of the barge. As the oil reaches the ingress opening it is propelled into a hold of the barge due to the pressure differential between the outside and the inside of the barge. Oil thus accumulating in a hold of the barge may be removed therefrom from time to time and clear water as may also enter the hold is returned to the body of water.

16 Claims, 10 Drawing Figures

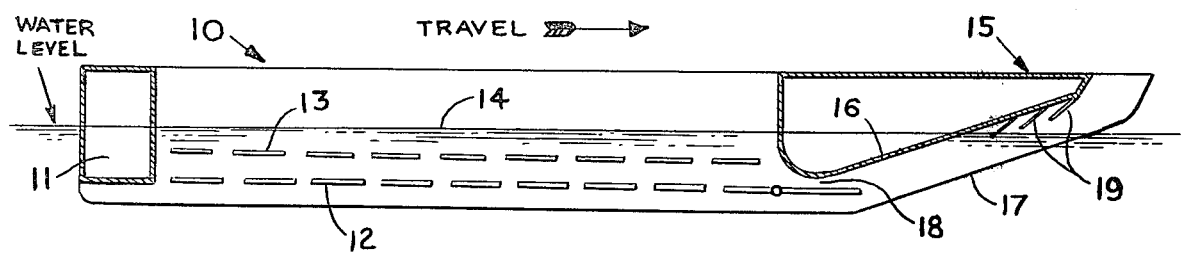
FIG. 1
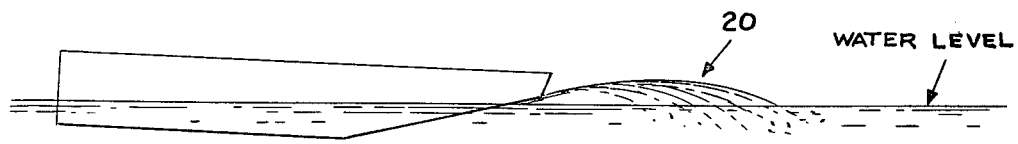
FIG. 2
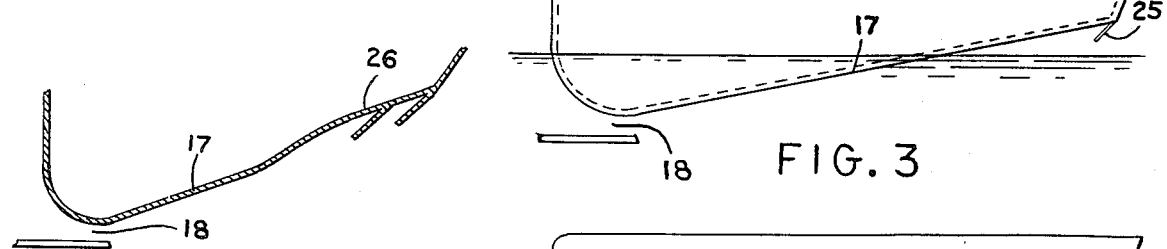
FIG. 3
FIG. 4
FIG. 5
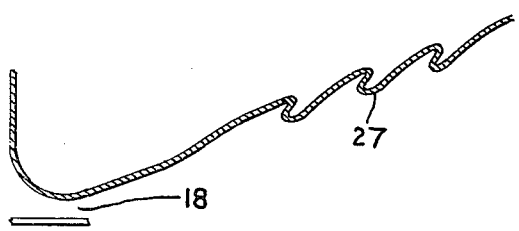
FIG. 6
FIG. 7
FIG. 8
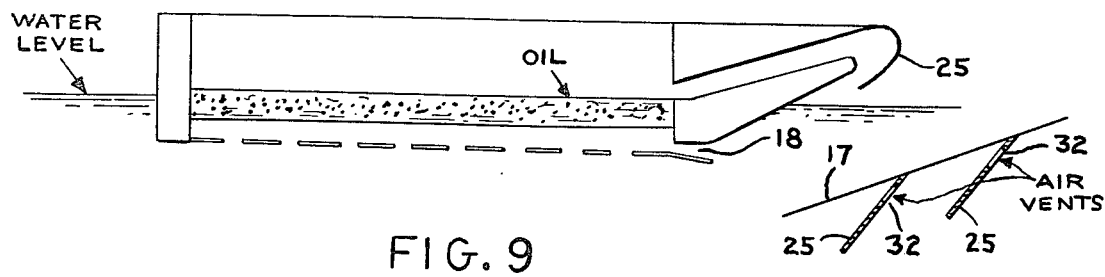
FIG. 9
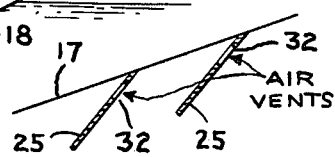
FIG. 10

DEVICE FOR REMOVING OIL SLICKS

The present invention relates to an oil skimmer vessel, and more particularly to an oil skimmer vessel for use in open water, such as the sea.

BACKGROUND OF THE INVENTION

The removal of oil slicks on open water a now rather frequent occurrence caused by leakage or break-down of oil tankers has become very important to the environmental protection. Various types of devices have been developed for the purpose. The present invention refers to a type generally referred to as oil skimmer vessels and more particularly to an oil skimmer vessel as shown in applicant's prior U.S. Pat. No. 3,715,034. An oil skimmer vessel according to this patent comprises a vessel which has a broad flat and rearwardly sloping bow which includes below the water level an inlet opening or slot leading into a well or pool within the hull of the vessel. When such skimmer vessel is driven through an oil slick the oil larger portion more or less mixed with water which impacts upon the bow is deflected to flow downwardly along the bow wall thereby causing at least a major portion of the oil through the bow opening into the well. Water which may also flow into the well is discharged through hull openings below the water level.

Skimmer vessels of this type have been found highly efficient in calm water. However, extensive tests have shown that in rough water the resulting pitching of the vessel may cause oil and water to splash forward with some violence, causing the breaking up of the oil slick and water into a cloud of drops. Such a cloud is difficult to remove because the violence of the splash mixes much of oil with water, forming at times a cloud more than a foot thick.

THE INVENTION

It is a broad object of the invention to improve a skimmer vessel of the type shown in my U.S. Pat. No. 3,715,034 so that it collects oil in an oil slick essentially as efficiently in rough water as in calm water. A more specific object of the invention is to provide a skimmer vessel of the general type above referred to so that the collection of oil floating on rough water is essentially as efficient as it is in calm water by providing on the outside of flat sloping bow of the vessel one or more vanes.

SUMMARY OF THE INVENTION

It was found by research and tests that with a skimmer vessel as previously referred to the splash caused by rough water is in the form of a relatively thin sheet of liquid containing oil and water the direction of which splash closely follows the lower surface portion of the bow. It was further found that the splashed liquid can be conveniently intercepted by a vane projecting generally downwards from the surface of the bow, or by a plurality of such vanes. It was also found that the liquid splashed forward is formed by that part of the water which normally lies in front of the bow and which is 'hit' by the bow when the bow pitches downwards. The part of the bow already submerged does not contribute significantly to the forward splash. The vanes are required mainly on that part of the bow which is normally above the water line.

Accordingly, at least one vane as previously described must be provided above the entry opening in the bow. However, while such single vane can intercept at least most of splashed liquid it was found by tests that a plurality of vanes insures that the splash is subdivided into sections each of which is intercepted by the vane immediately in front of it. This reduces the violence of the impact inside the pocket formed by the vanes and also reduces the travel of each portion of the splashed liquid, thus aiding the process of skimming. Depending on the orientation of the vanes the splash created by each vane is projected forward or backwards into the above-mentioned pocket. If the relative motion between the bow and the water level could be exactly predicted the vanes could be oriented so that no forward splash is produced at all.

While the bow descends due to the pitching of the vessel the pockets formed by the vanes are filled with air, and this air helps to cushion the impact of the water splashed into the pocket. Furthermore, splashing can be created only by a solid, or relatively solid surface; once the water surface seals the air pockets this prevents deeper immersion of the vane, and the splash in that pocket ceases. Accordingly, only a small proportion of the vane area takes part in the splashing, thus greatly reducing the agitation of the water surface and of the oil slick floating on it.

During the upward motion of the bow the liquid that is a mixture of oil and water trapped between the vanes pours out at a relatively low velocity. Therefore, by comparison with an unimpeded splash, the impact of the interrupted splash upon the water is greatly reduced, thus reducing the formation of oil drops. It has further been found that in a skimmer vessel according to applicant's prior patent, that is a vessel which depends for its action upon being driven through a flow of water and oil causing oil and water to flow along the bow and to a reception slot, it is an advantage to place the vanes in a recess formed in the bow so that the outer tips of the vanes are in line with the outline of the remaining portion of the bow.

The orientation of the anti-splash vanes can take several forms, but it has been found that for the best results the vanes project downwards and backwards at an angle to the bow of 20 to 40 degrees. For constructional purposes the vanes may conveniently be formed as a series of corrugations in the skin of the bow.

The motion of the bow in a rough sea is a combination of the forward motion of the vessel and of the pitching motion of the bow. The magnitude of these two components depends on the state of the sea so that the resultant of the motions can vary widely as to direction and magnitude. The choice of the configuration of the anti-splash vanes, therefore, has to represent a compromise. The backward-directed vanes have the advantage that during the time the vanes are submerged they offer smaller drag and create smaller disturbance of the water and oil flowing downwards past the bow. Because the bow often descends while tilted to one side some of the splash may be directed along the vanes and it is desirable to provide longitudinal barriers to arrest that motion. The vanes may also be provided with openings to permit the escape of some of the air trapped between the vanes.

An alternative way to deal with the liquid intercepted by the vanes is to provide a passage communicating the pocket behind the vane with the pool of oil collected inside the vessel. The high velocity of the splash enables it to travel upwards and over the edge of the oil pool or tank.

BRIEF DESCRIPTION OF THE DRAWING

In the accompanying drawings several embodiments of the invention are shown by way of illustration and not by way of limitation. In the drawing:

FIG. 1 is a lengthwise diagrammatic view of a skimmer vessel according to the invention;

FIG. 2 shows a flat bow surface without vanes;

FIG. 3 shows a bow wall mounting a single vane;

FIG. 4 shows two vanes mounted in a recess of the bow hall;

FIG. 5 shows a bow wall mounting a plurality of spaced apart vanes;

FIG. 6 shows vanes formed by corrugations in the slanted bow wall;

FIG. 7 showing forward splash caused by rearward facing vanes;

FIG. 8 showing splash caused by forward facing vanes;

FIG. 9 shows splashed oil and water fed into a pool within the hull of the vessel; and FIG. 10 shows vanes including one or more air vents.

DETAILED DESCRIPTION OF THE DRAWING

Referring now to drawing figures and first to FIG. 1, this figure shows diagrammatically a skimmer vessel as described in my prior patent. Pumping equipment and other equipment as shown in the patent are omitted as the essential inventive features are limited to the construction of the vessel itself. The hull 10 of the vessel is shown as having a watertight stern chamber 11, a perforated bottom 12, and a perforated screen 13. The water level is indicated by the line 14. As described in the patent the perforated screen and bottom serve to discharge water entering into the hull simultaneously with the collected oil. Referring now to the bow end 15 of the vessel, the bow comprises a flotation chamber closed at the water side by a rear end rearwardly sloping wall 16 from which extends a fin 17. The wall 16 includes an inlet slot 18 for oil and water.

According to the invention one or a plurality of vanes 19 extend from the wall 16 as will be described more in detail hereinafter.

FIG. 2 shows the slanted bow end of the vessel without vanes. As previously described such bow end causes a forward splash and formation of a cloud of oil drops indicated by arrow 20 as tends to occur when the vessel is pitching in rough water. As also previously described such splashing markedly reduces the collection of oil.

FIG 3 shows a bow with a single vane 25 rearwardly protruding from the forward bow end, and extending substantially across the width of the flat bow surface. When used with a skimmer 33 feet long the height of the vane 25 is generally between six and twelve inches.

FIG. 4 shows similar vanes 25 seated in a recess 26 in the otherwise flat bow wall.

FIG. 5 shows a plurality of spaced vanes 25 all slanted similar to the vanes in FIG. 4. The angle of the vanes 13 is preferably between 20 and 40 degrees and the spacing of the vanes is, in a 33 foot vessel, between six and twelve inches. The vanes are positioned above the water level to break up and reduce splashes of oil and water as tend to occur when the vessel is pitching in rough water thereby thereby maintaining the influx of oil into the opening 18 in large quantities also in rough water.

FIG. 6 shows vanes 27 formed by corrugating the slanted wall portion of the bow. The length, height and spacng of the corrugations is substantially the same as that of the vanes as shown for instance in FIG. 5.

Tests indicate that by way of example on a 33-foot long skimmer vessel the thickness of the splash tends to be of the order of two to six inches if the bow is without vanes. The forward velocity of water varies during each pitch because the bow oscillation is more or less sinusoidal in character. The result is that the splash does not look like a thin sheet, but more like a fan, some of the water travelling far and other parts falling short. When the bow is fitted with anti-splash vanes according to the invention each vane will create a little splash which will be captured by the next vane.

Referring to FIG. 7 this figure shows a portion of the bow mounting rearward facing vanes 25 as shown for instance in FIGS. 1 and 4 and the splash 30 is caused by and between the vanes.

FIG. 8 shows forward facing vanes 25a. As indicated the splash generated by the rearward facing vanes is considerably larger than that generated by the forward facing vanes.

FIG. 9 shows the hull of the skimmer vessel and more specifically the tank or pool into which liquid enters the hull through the inlet slot 18 in the bow for separating oil and water. As previously explained, the oil water mixture intercepted by the vane 25 enters a passage 31 between the vane and the pool of oil in the tank or hold of the vessel. The high velocity of the splash as generated by the bow enables it to travel upward and into the pool of oil where the water separates from the oil and discharges through the holes in the bottom of the vessel.

FIG. 10 shows vanes of the types previously described but including air vents 32. One or more air vents may be provided in some or all of the vanes. These air vents serve to reduce the mixing of the air trapped between the vanes with the splashed oil and water thereby reducing the formation of oil drops and increasing the efficiency of oil skimming action.

While the invention has been described in detail with respect to certain preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

I claim:

1. A skimmer vessel for skimming oil floating on open water, said vessel comprising: a hull having a forwardly facing broad and substantially flat bow wall surface rearwardly and downwardly slanted toward the stern of the hull, said bow surface including an elongate and substantially horizontally disposed inlet opening at the rear thereof; a hold within the hull communicated with said inlet opening for accumulating therein a pool of oil and water deflected along said slanted bow wall and entering into said opening upon forward drive of the vessel; and vane means extending from and across said slanted bow wall surface for reducing forward splashing of oil and water as caused by pitching of the hull thereby increasing the entry of oil and water into the hold within the hull, said vane means comprising a plurality of spaced vane members having upper edges secured to said bow surface and lower edges spaced from said bow surface rearwardly and downwardly such that the vane members are inclined with respect to said bow surface at an acute angle rearwardly and downwardly.

2. The skimmer vessel according to claim 1 wherein said vane members are rigid and are disposed intermediate the upper end of the flat bottom portion and said inlet opening.

3. The skimmer vessel according to claim 2 wherein said vane members are said parallel to each other.

4. The skimmer vessel according to claim 3 wherein said vane members are disposed at the upper end of the bow surface so as to be above the normal water level.

5. The skimmer vessel according to claim 2 wherein said vane members include air vents.

6. The skimmer vessel according to claim 5 wherein said air vents are disposed closely to said substantially flat bow portion.

7. The skimmer vessel according to claim 6 wherein said vane members are parallel to each other.

8. The skimmer vessel according to claim 7 wherein said vane members are disposed at the upper end of the bow surface so as to be above the normal water level.

9. The skimmer vessel according to claim 7 wherein said air vents are disposed closely to said substantially flat bow portion.

10. The skimmer vessel according to claim 6 wherein said vane members include air vents.

11. A means for collecting oil floating on a body of water, said means comprising: a skimmer vessel with bottom, sidewalls, a bow and a stern and adapted to float on the surface of a body of water, a hold within said vessel defined by said bottom, sidewalls, bow and stern, the bow of said vessel comprising a portion including a surface area forwardly inclined upwardly in the bow direction and extending between said sidewalls and with a top edge and a bottom edge extending respectively above and beneath the surface of said body of water, horizontally elongate opening means in said bow surface at the rear thereof leading into said hold within said vessel and vane means projecting from said bow surface and extending transversely thereacross such that with forward motion of the vessel, oil in the path of said inclined bow surface area is deflected downwardly by the inclined bow surface area and caused to flow in the form of a layer along said bow portion and the bottom of the vessel and the pressure differential between the inside and outside of the vessel causes at least a substantial part of the oil contained in said layer to flow into said hold through said opening means and said vane means reduces forward splashing as caused by pitching of the vessel thus reducing forward ejection of the layer of oil and water and increasing the flow of the layer of oil and water which is deflected along said outer bow surface and into said opening, said vane means comprising a plurality of spaced vane members having upper edges secured to said bow surface and lower edges spaced from said bow surface rearwardly and downwardly such that the vane members are inclined with respect to said bow surface at an acute angle rearwardly and downwardly.

12. The skimmer vessel according to claim 11 wherein said vane members are rigid and are disposed intermediate the upper end of the flat bottom portion and said inlet opening.

13. A skimmer vessel for skimming oil floating on open water, said vessel comprising: a hull having a forwardly facing broad and substantially flat bow wall surface rearwardly and downwardly slanted toward the stern of the hull, said bow surface including an elongate and substantially horizontally disposed inlet opening at the rear thereof; a hold within the hull communicated with said inlet opening for accumulating therein a pool of oil and water deflected along said slanted bow wall and entering into said opening upon forward drive of the vessel; and vane means for reducing forward splashing of oil and water as caused by pitching of the hull thereby increasing the entry of oil and water into the hold within the hull, said vane means comprising a vane member extending across said slanted bow surface in spaced relation in front of the upper end of said bow surface, said hull having a passageway therein located above said bow surface and having one end in communication with said hold and an opposite end facing said vane member which forms an inlet to said passageway for entry thereinto and then into said hold of water and oil produced by forward splashing.

14. The skimmer vessel according to claim 13 wherein said vane member is curved and extends in part below said bow surface and in part thereabove.

15. A means for collecting oil floating on a body of water, said means comprising: a vessel with bottom, sidewalls, a bow and a stern and adapted to float on the surface of a body of water, a hold within said vessel defined by said bottom, sidewalls, bow and stern, the bow of said vessel comprising a portion including a surface area forwardly inclined upwardly in the bow direction and extending between said sidewalls and with a top edge and a bottom edge extending respectively above and beneath the surface of said body of water, horizontally elongate opening means in said bow surface at the rear thereof leading into said hold within said vessel, said vessel having a passageway therein located above said surface area of the bow portion, said passageway having one end in communication with said hold and an opposite open end at said bow and vane means on said bow for diverting forwardly splashed water and oil as caused by pitching of said vessel into said passageway such that with forward motion of the vessel, oil in the path of said inclined bow surface area is deflected downwardly by the inclined bow surface area and caused to flow in the form of a layer along said bow portion and the bottom of the vessel and the pressure differential between the inside and outside of the vessel causes at least a substantial part of the oil contained in said layer to flow into said hold through said opening means and said vane means diverts forwardly splashed oil and water into said passageway, said vane means comprising a vane member extending across said slanted bow surface in spaced relation in front of the upper end of said bow surface, said vane member facing said open end of said passageway to form an inlet for said passageway for entry thereinto and then into said hold of water and oil produced by forward splashing.

16. The skimmer vessel according to claim 15 wherein said vane member is curved and extends in part below said bow surface and in part thereabove.

* * * * *